Dec. 7, 1965 F. R. KALHAMMER 3,222,530

ULTRA-SENSITIVE PHOTO-TRANSISTOR DEVICE COMPRISING WAFER HAVING HIGH RESISTIVITY CENTER REGION WITH OPPOSITE CONDUCTIVITY, DIFFUSED, LOW-RESISTIVITY, AND TRANSLUCENT OUTER LAYERS

Filed June 7, 1961

INVENTOR.
FRITZ R. KALHAMMER

BY Albert L. Free

AGENT

United States Patent Office 3,222,530
Patented Dec. 7, 1965

3,222,530
ULTRA-SENSITIVE PHOTO-TRANSISTOR DEVICE COMPRISING WAFER HAVING HIGH RESISTIVITY CENTER REGION WITH OPPOSITE CONDUCTIVITY, DIFFUSED, LOW-RESISTIVITY, AND TRANSLUCENT OUTER LAYERS

Fritz R. Kalhammer, Philadelphia, Pa., assignor, by mesne assignments, to Philco Corporation, Philadelphia, Pa., a corporation of Delaware Filed June 7, 1961, Ser. No. 115,383
5 Claims. (Cl. 250—211)

This invention relates to photo-transistor devices and to methods for their manufacture.

Photo-transistors are known in the prior art which are responsive to changes in illumination to produce changes in output current. Such devices have comprised, in essence, a conventional grown-junction or alloy-junction PNP or NPN transistor packaged so that light can reach regions with a diffusion length of one or both PN junctions. A typical grown-junction photo-transistor is shown for example in U.S. Patent No. 2,641,713 of J. N. Shive, filed March 21, 1951, and issued June 9, 1953. This device is in the form of a strip of semiconductor containing N, P, and N regions along its length, and a potential difference is applied between the N regions by way of a load device to forward-bias one of the P-N junctions and to reverse bias the other. No connection is made to the base. In the absence of illumination only a small current flows in the series circuit which includes the transistor, a source of potential difference and a load. However when illumination is applied to the exposed face or edge of the central P-type region, which is analogous to the base of an ordinary transistor, the current through the transistor and the external load increases markedly. The action of the incident photons of light in producing hole electron pairs in the base is multiplied by the transistor action of the device so that for each photon reaching the base there is produced a current increase of many electrons, e.g., 100 electrons per photon.

Another known type of photo-transistor using alloy-junctions is shown and described at pages 16–17 of "Handbook of Semiconductor Electronics," by Lloyd P. Hunter, McGraw-Hill Book Company, New York city, 1956. In this device the region immediately surrounding the circular emitter of an alloy-junction transistor is impinged by the illumination and produces a current increase as in the grown-junction device described above.

While such photo-transistors are operative to produce useful current increases in response to increases in light and generally respond much more rapidly than ordinary photo-conductors to such changes, their sensitivity has been less than is desired for many applications in which small variations in light intensity must be detected or used to operate high-current load devices.

Accordingly it is an object of my invention to provide a new photo-transistor device.

Another object is to provide such a device having increased sensitivity to illumination.

It is another object to provide a new method for making photo-transistor devices.

Still another object is to provide a method for making photo-transistors of improved characteristics.

In accordance with the invention the above objects are achieved as follows. A photo-transistor is made in the form of a single-crystalline wafer of semiconductive material of high-resistivity and of a given conductivity type having in opposite major surfaces thereof a pair of thin layers of a conductivity type opposite to said given conductivity type and of a resistivity many times lower than said high resistivity. These layers are sufficiently thin that a central region of said given conductivity type remains between them, and conductive contacts are made to each of said layers so that a large part of at least one of the layers is open to illumination. Preferably the original wafer is made as thin as is convenient for handling, and its purity and the thickness of the wafer between the surface layers is such that the diffusion length of minority carriers in said central region is at least as great as the thickness of said central region.

Preferably the wafe is of N-type silicon having a resistivity of the order of 500 to 2,500 ohm-centimeters and a long lifetime for holes, while the surface layers are P-type, formed by diffusion of vaporous impurities into opposite surfaces of the wafer, and of such low resistivity as to be substantially degenerate semiconductors at their external surfaces.

To operate the photo-transistor the illumination to be detected is directed against the broad external surface of one or both of the thin surface layers and a difference of potential is applied between the conductive contacts to the two layers. The current through the photo-transistor then increases with the incident illumination. The use in the wafe of very high-resistivity material, which is not used in ordinary transistors, enhances the lifetime of minority carriers injected into the central region and thus enhances the current increase per unit increase in illumination, i.e., the photoconductive gain. In addition the high-resistivity permits the space-charge region adjacent the surface layer which is reversed-biased to extend substantially toward the opposite surface layer even for relatively small applied voltages and thus to reduce the effective width of the central region with consequent improvement in photoconductive gain. The low resistivity of the surface layers permits the use of contacts to only a minor parts of the layers, leaving the rest of the layers open to illumination, without interfering with the application of a substantially uniform potential over the entire surface of each layer as is necessary for efficient operation. The wafer-type geometry of the device permits light to be applied to a broad area of the sensitive surface of the device, thus further increasing the responsiveness of the device to illumination, and also permits use of a high total current due the large area of the device normal to current flow.

I have further found that a photo-transistor of uniquely high sensitivity is obtained when the thin surface regions are formed by vapor-phase diffusion of boron into a thin wafer of N-type silicon in an atmosphere of oxygen. When so made my photo-transistor has exhibited photoconductive gains of well over 10,000 as compared with the 300 to 400 typically produced by the best prior-art photo-transistors.

Other objects and features of the invention will be more readily understood from a consideration of the following detailed description, taken in connection with the accompanying drawings, in which.

The invention will first be described with specific reference to one particular structural embodiment thereof and one specific method for fabricating it, although the invention is not limited to the specific structure and method now to be described.

Figure 1:
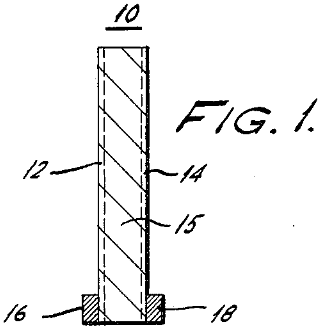
FIGURES 1 and 2 are sectional and plan views, respectively, of the active portion of a photo-transistor device constructed in accordance with the invention.
Figure 2:
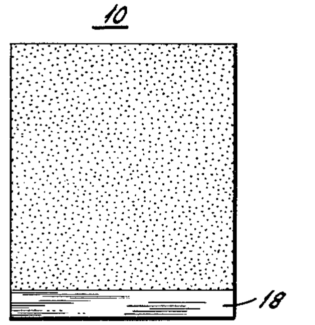

Referring first to FIGURES 1 and 2, in which like parts are designated by like numerals, a body of single-crystalline semiconductive silicon 10 of N-type conductivity, having a resistivity of about 2,000 ohm-centimeters and a hole lifetime of about 500 microseconds, is provided over its two opposed major surfaces with two separate, thin P-type conductivity layers 12 and 14 each providing a rectifying PN junction at its interface with the N-type bulk of wafer 10. Typically each of layers 12 and 14 has a thickness of about 0.05 mil while the wafer 10 is about 4 mils thick and in the form of a rectangle of the order of ⅛ inch by ¹⁄₁₆ inch in size. These two P-type layers are of very low-resistivity material so as to provide a concentration of hole carriers of greater than 2 x $10^{20}$ holes per cubic centimeter at their exterior surfaces, thereby providing substantially metallic surface conduction while permitting the transmission through the layers of incident light. A pair of plated-nickel conductive contacts 16 and 18 provide strip-like connections to the surface layers 12 and 14 respectively.

Figure 3:
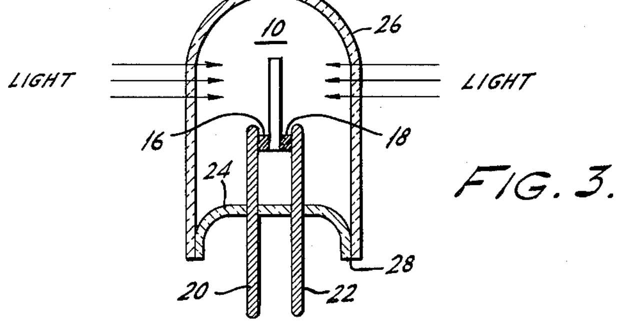
FIGURE 3 is a sectional view of a complete photo-transistor unit, illustrating how the device of the invention may be packaged.

As represented in FIGURE 3, the unit thus far described may be mounted by soldering the contacts 16 and 18 to a pair of supporting and conductive lead wires 20 and 22 respectively, the latter support members passing through and being rigidly supported by a glass base member 24. The entire active element is covered by a cap 26 sealed to the base 24, as at 28. The cap is made of a material, such as glass, which permits light of the wavelengths to be detected to pass from the exterior onto at least one and preferably onto both of the exposed major surfaces of the wafer 10.

To operate the device the two leads 20 and 22 are supplied with a difference in potential while the light to be detected is impinged upon one or both of the exposed surfaces of the wafer 10. Increases in illumination impinging on the wafer will then produce corresponding increases in the current through the external circuit, which may be utilized for any purpose such as operating a switch, indicator or other load device.

The device shown in FIGURES 1 and 2 is preferably made by vapor-phase diffusion into the opposite surfaces of an N-type wafer of an impurity which has the effect of converting a thin surface layer of the wafer from high-resistivity N-type to very low-resistivity P-type material. Such processes and suitable apparatus for performing them are well known in the diode and transistor art and need not be described here in detail. One preferred procedure for making especially sensitive photo-transistors is generally as follows.

The silicon material to be diffused is provided by cutting a circular disc from across the axis of a generally cylindrical ingot of single-crystalline silicon containing appropriate traces of an N-type dopant so as to provide the desired high resistivity of around 2,000 ohm-centimeters. Methods for growing such single- crystal ingots and for cutting wafers from them transverse to the axis of growth are well known in the semiconductor art and need not be described here in detail. Typically the wafer is about ¾ inch in diameter, generally circular, and about 10 mils in thickness when cut. It is then lapped mechanically from both sides and polished to an optically smooth finish to reduce its thickness to about 4 mils and to produce a uniform fine-textured surface for the wafer. The wafer may then be cleaned in a hot solution of chromic and sulfuric acids, rinsed several times in boiling deionized water and stored in methyl alcohol until it is ready for the diffusion process.

Figure 4:
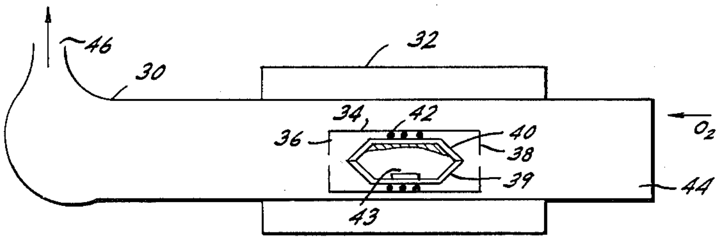
FIGURE 4 is a diagram of an arrangement which may be utilized in fabricating my novel photo-transistor.

As shown in FIGURE 4, the apparatus for performing the diffusion may comprise a quartz tube 30 provided with a surrounding heater element shown generally at 32 which can be controlled to determine accurately the temperature within the portion of the quartz tube which it surrounds. Resting within the quartz tube in the heated region is a platinum tube 34 having apertured end closures 36 and 38, and within the platinum cylinder is a symmetrical box and cover arrangement 39, 40. As shown the two parts of the box, which is of spectrally pure aluminum-oxide, may be held together by wrapping platinum wire 42 around them. On the bottom of the box during the diffusion operation is the silicon wafer 43. During the diffusion process a source of oxygen supplies a constant flow of oxygen gas into the inlet 44 of the quartz tube and through the region containing the aluminum oxide box and the wafer 43 to the outlet 46 from the quartz tube.

The source of impurity for the diffusion process in this example was 50 mole percent of $B_2O_3$ and 50 mole percent of $SiO_2$, mixed together in powder form. After oxygen has been passed through the tube for about one-half hour the mixture of the source substances is placed within the box and heated to about 1,250° centigrade by operating the heater 32. This causes the mixture to melt and to cover what is then the bottom of the box and to deposit in vapor form on all the interior surface of the box including what is then the top. Next the box is turned up-side-down, opened and the wafer 43 prepared as described above is placed flat upon what is now the bottom 39 of the box as shown in FIGURE 4. The molten source adheres by surface tension to the top 40 of the box. The box is then wrapped with the platinum wire 42 and placed in the position shown in FIGURE 4.

Next the temperature in the box is raised to about 1,275° centigrade, maintained at this value for about 15 minutes and then reduced to room temperature. Following this treatment the wafer has a P-type layer over all of its surfaces caused by the diffusion of the boron from the source into the surface of the silicon, which layer is approximately 0.05 mil thick and has a very low-resistivity, the concentration of hole carriers in the layer at the surface being about 5 x $10^{20}$ carriers per cubic centimeter. The wafer is removed from the furnace, diced into blanks of convenient size, and the contacts 16 and 18 applied, as by electroplating nickel onto the bottom of the blank on each side.

Figure 5:
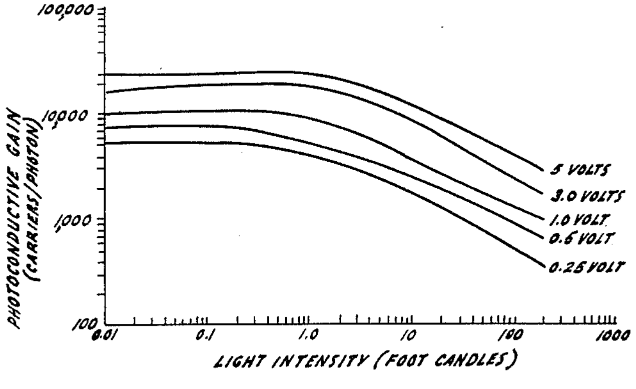
FIGURE 5 is a graphical diagram showing certain characteristics of a photo-transistor constructed in accordance with the invention.

Typical responsive curves of a device fabricated in the manner just described are shown in FIGURE 5. This figure is a plot of photo-conductive gain of the photo-transistor on a logarithmic scale as ordinate and incident light intensity in foot candles as abscissa, different curves being for different values of the voltage applied between the two P-type layers. The photo-conductive gain is the ratio of the number of electrons released from the photo-transistor into the external circuit per photon of light incident on the photo-transistor. The lowest of the five curves is for a potential difference of 0.25 volt, and the successively higher curves are for voltages of 0.5, 1.0, 3.0 and 5.0 volts respectively. As the curves show, with only a few volts of applied voltage the photo-conductive gain exceeds 10,000 for low light intensities, and in the case of five volts of applied potential difference the gain is greater than 10,000 even for light intensities up to 10-foot candles. This is about 25 times greater than the photo-conductive gains obtained with photo-transistors known prior to the invention. The photo-conductive gain can be further increased by coating the exposed parts of the semiconductor with an anti-reflective coating of the type used on optical lenses.

In producing these greatly improved photo-transistors I have found that the use of an atmosphere of oxygen during the diffusion of the boron produces important improvements in operation, the same process performed with nitrogen or argon as the atmosphere resulting in photo-transistors of substantially less photo-conductive gain and higher dark current.

The response time of my photo-transistor is very short, typically of the order of a millisecond, so that it can readily be utilized in applications requiring fast response such as counting or sorting machines for example.

The basic mechanism of operation of the device is believed to be generally similar to that for prior art photo-transistors, and indicated for example in the above-cited references. Incident light photons enter the semiconductor and produce hole-electron pairs. Those hole-electron pairs produced within a diffusion length of the P-N junctions formed between each P-type surface layer and the central N-type region are in effect sorted by the junctions, and the electrons are trapped and stored in the N-type central region. This increases the injecting action of the forward-biased P-N junction, which in turn by transistor action alters the collector current. The gain results from this transistor action, which is analogous to that produced in a grounded-emitter transistor stage. As pointed out above, however, my photo-transistor differs from an ordinary transistor not only in the absence of a base connection but also in the use of extremely high resistivity base material and in the provision for exposing the semiconductor to light through the major surfaces.

The use of high-resistivity material for the central region of wafer 10 has as one advantage the effective narrowing of the region between the P-type layers. The gain of a photo-transistor increases as the base is made smaller but it is impractical to make a large area device as is desired for best sensitivity and yet use a wafer thinner than about three or four mils. However the effective thickness for purposes of photo-transistor gain is that between the emitter and collector space-charge regions. When the collector junction is reverse-biased during operation the space-charge region adjacent the collector becomes thicker and reduces the effective base width. If the resistivity of the semiconductor is low the amount of space-charge widening per volt of reverse-bias is small, and breakdown of the material may occur before the voltage is high enough to produce the desired small effective base width. However with the high-resistivity material used in my device small reverse-biases are sufficient to produce a large amount of space-charging widening and a small effective base width, so that as shown in FIGURE 5 very large photo-conductive gains are obtained at only 5 volts, for example.

The use of very low resistivity diffused layers 12 and 14 not only provides the large-area PN junctions desired but also provides low resistance connection from the contacts 16 and 18 to the entire area of the junctions as is required to produce the proper uniform forward and reverse biases over all of the junction area. The contacts 16 and 18 therefore need only be made to a small part of the layers 12 and 14, and the remainder of the P-type layers can therefore be exposed to the illumination rather than being covered by an opaque contact as in the alloy-junction photo-transistor mentioned hereinbefore.

While it is preferred to utilize a starting wafer of N-type silicon with boron as the diffusing impurity, it is also possible to make photo-transistors similar to those described using a starting wafer of P-type silicon by diffusing into it an N-type dopant such as phosphorus.

Although the invention has been described with specific reference to particular embodiments thereof, it is susceptible of construction in a wide variety of forms. Accordingly the invention is limited only by the scope of the appended claims.

I claim:

1. A photo-transistor device, comprising: a thin wafer of single-crystalline silicon having the resistivity of about 1000 to 2000 ohm-centimeters and having a given conductivity type; a pair of low-resistivity diffused layers in opposite surfaces of said wafer of a conductivity type opposite to said given conductivity type, said layers being sufficiently thin to leave between them a central region of said wafer of said given conductivity type and to form a pair of opposed rectifying barriers at the two interfaces between said central region and said pair of layers, at least one of said layers being open to illumination from the exterior of said device and transmissive of said illumination, the semiconductive material of said central region having a diffusion length for minority carriers which is at least as great as the thickness of said central region; and a conductive contact to each of said layers.

2. The device of claim 1 in which said central region of said wafer is silicon of N-type conductivity and has a resistivity between 1000 and 2000 ohm-centimeters, and in which said layers are of P-type conductivity and many times lower in resistivity than said N-type central region.

3. A photo-transistor, comprising: a thin wafer of silicon comprising a pair of boron-diffused P-type surface layers on opposite sides of an N-type central region having a resistivity of the order of 1000 ohm-centimeters, said central region having a diffusion length for holes at least as great as its thickness, at least one of said P-type layers being open to illumination from the exterior of said transistor and transmissive of said illumination; and a pair of conductive contacts each to one of said layers.

4. An extremely sensitive photo-transistor, comprising: a wafer of semiconductive material of a given conductivity having a resistivity of the order of 500 to 2500 ohm-centimeters, the opposing major surfaces of which have been converted to layers of a conductivity type opposite to the conductivity type of said wafer through surface diffusion thereinto with a given impurity, the thickness of the remaining central unconverted region of said wafer being less than the minority carrier diffusion length for said central region; and a conductive contact affixed to each of said layers.

5. The photo-transistor of claim 4 wherein said wafer is N-type silicon and said surface layers are comprised of silicon diffused with boron in the presence of oxygen.

References Cited by the Examiner

UNITED STATES PATENTS

| | | | |
|---|---|---|---|
| 2,641,713 | 6/1953 | Shive | 250—211 |
| 2,644,852 | 7/1953 | Dunlap | 250—211 |
| 2,669,635 | 2/1954 | Pfann | 250—211 X |
| 2,829,422 | 4/1958 | Fuller | 29—25.3 |
| 2,841,860 | 7/1958 | Koury | 29—25.3 |
| 2,914,665 | 11/1959 | Linder | 250—211 X |
| 2,993,998 | 7/1961 | Lehovec | 250—211 |
| 2,999,940 | 9/1961 | Hoffmann et al. | 250—211 |
| 3,002,100 | 9/1961 | Rutz | 250—211 |
| 3,005,107 | 10/1961 | Weinstein | 250—211 |
| 3,015,770 | 1/1962 | Van Santen et al. | 250—211 X |

RALPH G. NILSON, *Primary Examiner.*

WALTER STOLWEIN, *Examiner.*